United States Patent
Robert et al.

(10) Patent No.: US 8,315,994 B2
(45) Date of Patent: Nov. 20, 2012

(54) SYSTEM AND METHOD FOR UPDATING DIGITAL MEDIA CONTENT

(75) Inventors: Arnaud Robert, Burbank, CA (US); Edward C. Drake, Stevenson Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 261 days.

(21) Appl. No.: 12/383,688

(22) Filed: Mar. 26, 2009

(65) Prior Publication Data

US 2010/0114983 A1    May 6, 2010

Related U.S. Application Data

(60) Provisional application No. 61/110,488, filed on Oct. 31, 2008, provisional application No. 61/110,484, filed on Oct. 31, 2008, provisional application No. 61/110,485, filed on Oct. 31, 2008.

(51) Int. Cl.
    *G06F 17/30* (2006.01)

(52) U.S. Cl. ........................................ 707/694

(58) Field of Classification Search .................. 707/610, 707/694
See application file for complete search history.

(56) References Cited

U.S. PATENT DOCUMENTS

| 7,401,221 B2 | 7/2008 | Adent |
| 2002/0152318 A1 * | 10/2002 | Menon et al. ................. 709/231 |
| 2008/0170755 A1 * | 7/2008 | Nasser et al. ................. 382/106 |

FOREIGN PATENT DOCUMENTS

EP    1 821 537    8/2007

* cited by examiner

*Primary Examiner* — William Spieler
(74) *Attorney, Agent, or Firm* — Farjami & Farjami LLP

(57) ABSTRACT

There is presented a system and method for updating digital media content. The system comprises a data structure residing on a media storage, the digital media content being stored in the data structure. The system further comprises a processor coupled to the media storage and configured to access the data structure, and receive an update to one or more modifiable elements of the data structure from an authoritative source external with respect to the data structure. The processor is further configured to modify the modifiable elements according to the update, and store the modified elements in the data structure. As a result, updates to the modifiable elements are persistently stored in the data structure.

51 Claims, 4 Drawing Sheets

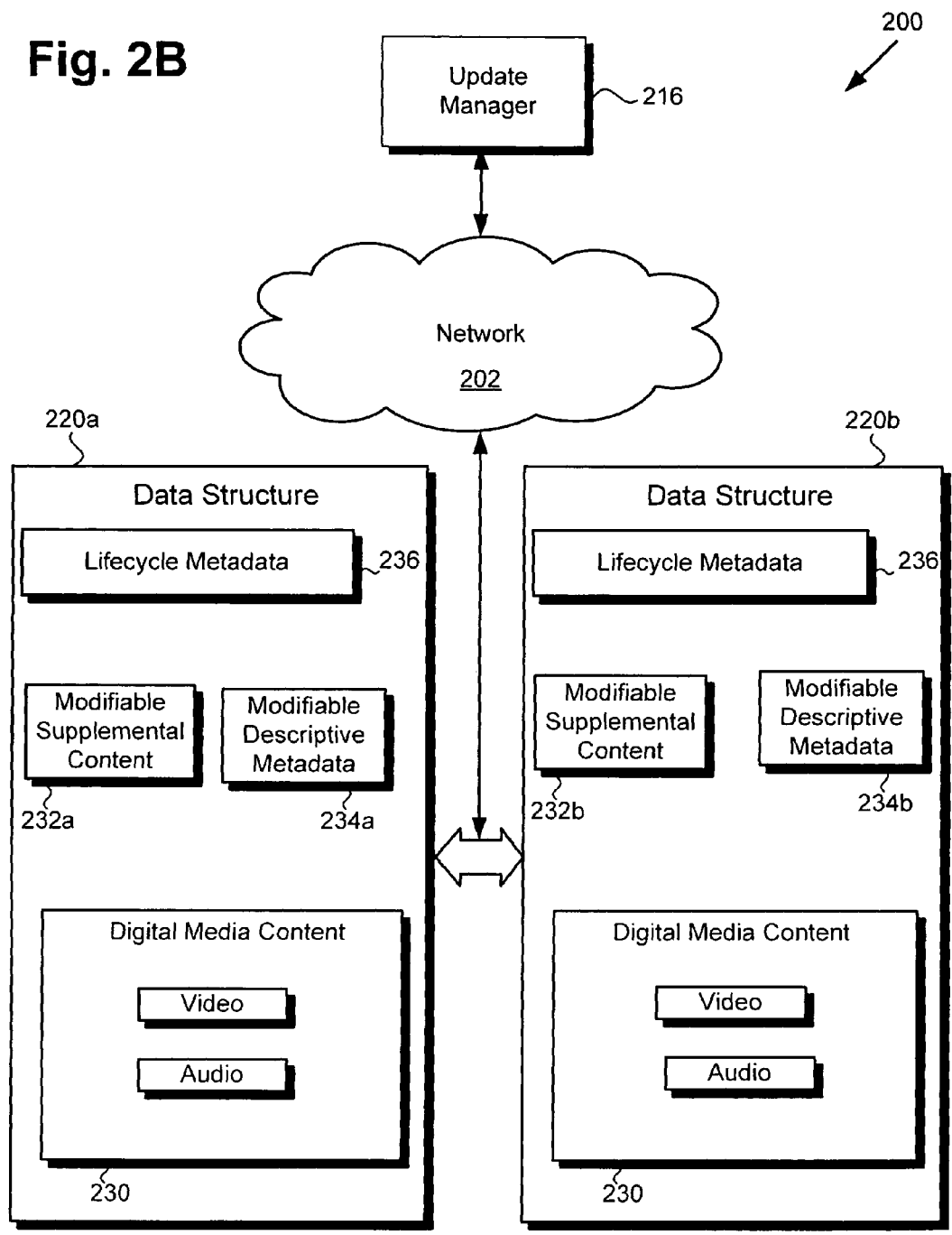

SYSTEM AND METHOD FOR UPDATING DIGITAL MEDIA CONTENT

RELATED APPLICATIONS

This application claims priority to U.S. Provisional Application No. 61/110,488 filed on Oct. 31, 2008, U.S. Provisional Application No. 61/110,484 filed on Oct. 31, 2008, and U.S. Provisional Application No. 61/110,485 filed on Oct. 31, 2008, which are hereby incorporated by reference in their entirety.

BACKGROUND OF THE INVENTION

1. Field of the Invention

The present invention relates generally to the management of media content. More particularly, the present invention relates to systems and methods for modifying and updating media content.

2. Background Art

A media file is a data structure containing media content, such as audio and/or video content, for example, that can be played back using a media player. The media file itself is an integral content unit recognized as such by the computer platform on which the media file resides or is used. Media files are commonly designed to store a single, identifiable item of core media content, encoded and arranged according to an established standard. Because the core content stored in a media file is often proprietary, it may be undesirable to permit a consumer or an entity other than the content owner to modify the core content after its encoding and arrangement within the media file. Consequently, although media files are created and may be edited or modified using software designed for that purpose, media files are typically not modifiable by the software resident on a media player.

Descriptive metadata associated with the core content stored in a media file can enhance the playback experience and add value to the core content. In this context, descriptive metadata refers to data that describes the core content. For example descriptive metadata may include the title of music or film content corresponding to the core content, the artist(s) or actor(s) performing the content, and the studio producing the content. Descriptive metadata may also include a description of the core content, information about the encoding of the core content, rights/licensing information, usage rules, watermarks or copyright ownership, and the like. The playback experience may be further enhanced by supplemental content associated with the core content. For example, in the case of core content corresponding to a cinematic film, supplemental content such as film reviews, promotional materials related to the film, movie trailers, and/or advertising related to the film, can add additional value to the core content. However, most media file formats presently in use do not store descriptive metadata and supplemental content within the media file structure.

One conventional solution for delivering the enhancements and advantages associated with descriptive metadata and supplemental content is to associate the media file with external metadata and supplemental content. In other words, the integral media file structure is associated with one or more data structures containing the descriptive metadata and supplemental content, which are themselves separate and distinct from the media file containing the core content. For example, external descriptive metadata may originate from a content storefront, such as Gracenotes accessed through the iTunes storefront, or from a website, such as imbd.com, or from some other remote database.

One advantage of using external descriptive metadata and supplemental content is that it allows information to be periodically updated. For example, film reviews, movie trailers, and promotional content associated with core content comprising a film can be kept current and fresh through this approach. There are, however, significant drawbacks associated with this conventional solution. One disadvantage is that this approach requires playback devices to warehouse descriptive metadata and supplemental content, and to maintain associations between that external content and the appropriate media file containing the core content. Another disadvantage is that, because the media file containing the core content is an integral file structure separate from the descriptive metadata and supplemental content, a copy operation performed on the media file transfers only the core content, not the descriptive metadata or the supplemental content stored separately.

Although presently in the minority, some media file formats do permit storage of descriptive metadata and supplemental content within the media file structure. While overcoming some of the problems associated with reliance on external storage of the descriptive metadata and supplemental content, this alternative approach, as conventionally practiced, introduces different problems of its own. For example, because the descriptive metadata and supplemental content are encoded and arranged in the media file prior to its distribution, that data becomes fixed and static upon delivery of the media file. Unfortunately for this approach, however, the lifetime of the core content may be much longer than that of the descriptive metadata and supplemental content accompanying it. For instance, core content comprising a feature film may retain its appeal to consumers for many years, but the trailers, advertising, and promotional content supplementing that core content may become outdated, irrelevant, and even inaccurate or misleading, far sooner.

Accordingly, there is a need to overcome the drawbacks and deficiencies in the art by providing a solution for managing media content that integrates storage of core digital media content, descriptive metadata, and supplemental content associated with the core content, and additionally enables updating of the modifiable content elements. It would be advantageous for the solution to further specify a time period or lifecycle for the core digital media content, during which period updating and/or other support functions are provided.

SUMMARY OF THE INVENTION

There are provided systems and methods for updating digital media content, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 2B shows a block diagram representing an update of modifiable elements contained by the data structure of FIG. 2A, according to one embodiment of the present invention.

DETAILED DESCRIPTION OF THE INVENTION

Figure 1:
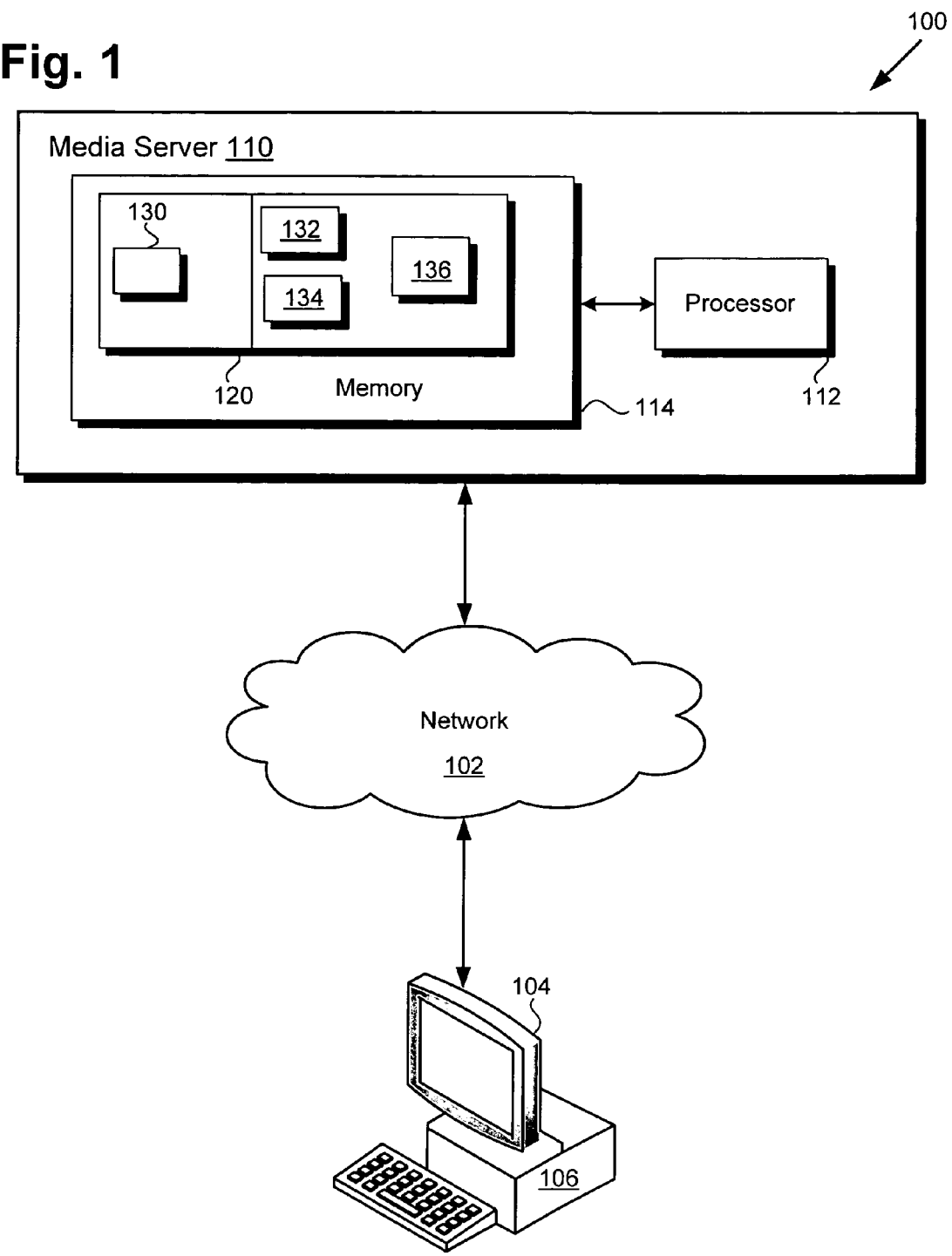
FIG. 1 shows a block diagram of a system for updating digital media content, according to one embodiment of the present invention.

The present application is directed to a system and method for updating digital media content. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 shows a block diagram of a system for updating digital media content, according to one embodiment of the present invention. In the embodiment of FIG. 1, system 100 comprises media server 110 including server processor 112 and server memory 114. As shown in FIG. 1, media server 110 is accessible over network 102, which may be any suitable communications network. System 100 also includes data structure 120 residing on server memory 114. Data structure 120 comprises digital media content 130, and modifiable elements including modifiable supplemental content 132 and modifiable descriptive metadata 134. Also included in data structure 120 is lifecycle metadata 136. FIG. 1 further shows media player 104, represented as a personal computer (PC), equipped with media player processor 106. In the embodiment of FIG. 1, media player 104 is in communication with media server 110 through network 102.

According to the embodiment of FIG. 1, server processor 112 and/or media player processor 106 may be configured to operate on data structure 120 so as to enable system 100 to update modifiable elements associated with digital media content 130. That is to say, server processor 112 and/or media player processor 106 may be configured to access data structure 120 including digital media content 130, modifiable supplemental content 132, and modifiable descriptive metadata 134 associated with digital media content 130. Server processor 112 and/or media player processor 106 may also be configured to receive an update to one or more of the modifiable elements, e.g., one or both of modifiable supplemental content 132 and modifiable descriptive metadata 134, from an authoritative source external to data structure 120, such as media server 110, for example. Server processor 112 and/or media player processor 106 may then modify one or both of modifiable supplemental content 132 and modifiable descriptive metadata 134 according to the update, and store the modified elements in data structure 120. Although in the embodiment of FIG. 1, modifiable supplemental content 132 and modifiable descriptive metadata 134 are shown as the only modifiable elements of data structure 120, that representation is merely exemplary, and more generally, a modifiable element may comprise any distinguishable set or subset of modifiable data within data structure 120.

Where, as in the embodiment of FIG. 1, data structure 120 further includes lifecycle metadata 136 defining lifecycle management parameters of digital media content 130, the updating of the modifiable elements, e.g., modifiable supplemental content 132 and modifiable descriptive metadata 134, may be performed according to the lifecycle management parameters specified by lifecycle metadata 136. As a result, system 100 provides a mechanism for the owner of a core digital media content, such as digital media content 130, to include modifiable data associated with digital media content 130, such as modifiable supplemental content 132 and modifiable descriptive metadata 134, in data structure 120. Moreover, inclusion of lifecycle metadata 136 in data structure 120 allows for management of digital media content 130 during the lifecycle specified by lifecycle metadata 136.

Because the present system enables use of data structure 120 as an archive for substantially all of the data elements associated with digital media content 130 in a single integrated data structure, a copy operation performed on data structure 120 transfers those associated data elements along with the core digital media content contained in digital media content 130. Thus, system 100 provides lifecycle management of digital media content 130 such that updates to modifiable supplemental content 132 and modifiable descriptive metadata 134 performed during a supported lifecycle of digital media content 130, are persistently associated with digital media content 130 through inclusion in data structure 120. In one embodiment, data structure 120 may comprise a container data structure storing data formatted in a container file format. A container format provides the benefits of flexibility and ease of use, but the present approach may alternatively use a non-container data structure and format.

In some embodiments, the updating of the modifiable elements by server processor 112 and/or media player processor 106 may occur during playback of digital media content 130. In other embodiments, however, the updating of modifiable supplemental content 132 and modifiable descriptive metadata 134 may be performed as a background operation when digital media content 130 is not being played back, for example, in conjunction with network-attached storage of data structure 120 on media server 110 or media player 104.

According to the present embodiment, the modifiable elements of data structure 120, e.g., modifiable supplemental content 132 and/or modifiable descriptive metadata 134, are updated by an authoritative source external with respect to data structure 120. Such an authoritative external source may be an owner of digital media content 130 or a third party authorized by the owner, for instance. As a specific example, updating of one or both of the modifiable elements modifiable supplemental content 132 and modifiable descriptive metadata 134 may be performed utilizing an application provided by the owner of digital media content 130. Alternatively, the updating may be performed using an application provided by one or more authoritative third parties.

Although the embodiment of FIG. 1 represents the authoritative external source for updating of the modifiable elements associated with digital media file 130 to reside on media server 110, that need not be the case. For example, updates may be provided by an authoritative owner or third party application stored on a portable computer-readable medium such as an optical disc, Universal Serial Bus (USB) dongle, or the like. In some embodiments it may be desirable to permit updating of some modifiable elements by a source other than an authoritative source. Under those circumstances, modifiable elements of data structure 120 may be appropriately tagged to distinguish secured modifiable elements, i.e., those limited to modification by an authoritative source, from unsecured modifiable elements, i.e., those eligible for modification by a non-authoritative source.

It is noted that although in the embodiment of FIG. 1, media player 104 is represented as a PC, in one embodiment media player 104 may comprise a home entertainment media player, such as a standard definition digital video disc (DVD) player or high-definition (HD) Blu-ray disc player, for example. In other embodiments, media player 104 may comprise any of a variety of mobile communication devices such as a tablet computer, mobile telephone, personal digital assistant (PDA), digital media player, or wireless gaming console, for example. In yet other embodiments, media player 104 may comprise one or more additional content servers interactively connected to media server 110 through network 102.

Although in the embodiment shown in FIG. 1, data structure 120 is shown to reside in server memory 114, in other embodiments, data structure 120 may reside in a media storage, e.g., memory, local to media player 104. For example, it is envisioned that data structure 120 may be downloaded or otherwise transferred to media player 104 for storage on media player 104. In addition, in some embodiments, not shown in FIG. 1, data structure 120 may be further copied or otherwise transferred from media player 104 to a subsequent media player device, such as a mobile telephone, PDA, or portable digital media player, for example.

As shown in FIG. 1, digital media content 130, stored in data structure 120, may be accessed through network 102. In one such embodiment, media server 110 may comprise a web server, accessible over a packet network such as the Internet, for example. Alternatively, data structure 120 may reside on a media server supporting a local area network (LAN), provided at a recreational venue such as a theme park or destination resort, for instance, or included in another type of limited distribution network.

Figure 2A:
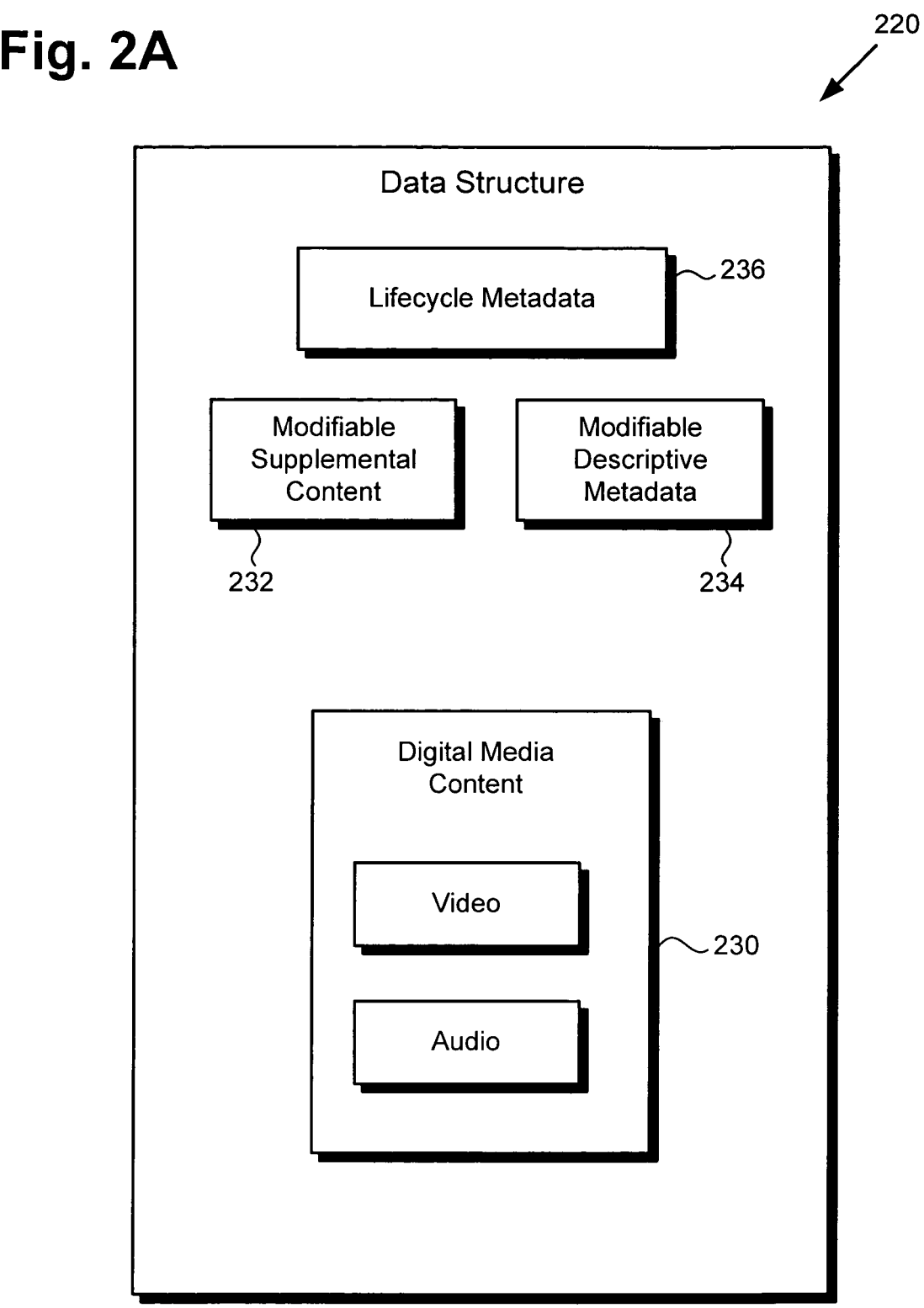
FIG. 2A shows a block diagram of a data structure for use in a system for updating digital media content, according to one embodiment of the present invention.

The operation of system 100, in FIG. 1, will now be further described by reference to FIGS. 2A and 2B. FIG. 2A shows a block diagram of data structure 220 for use in a system for updating digital media content, according to one embodiment of the present invention. FIG. 2B shows a block diagram of system 200 representing an update of modifiable elements contained by data structure 220, in FIG. 2A, according to one embodiment of the present invention.

FIG. 2A shows data structure 220, comprising digital media content 230, modifiable supplemental content 232 and modifiable descriptive metadata 234 associated with digital media content 230, and lifecycle metadata 236. Data structure 220 corresponds to data structure 120, in FIG. 1. Moreover, digital media content 230, modifiable supplemental content 232, modifiable descriptive metadata 234, and lifecycle metadata 236, in FIG. 2, correspond respectively to digital media content 130, modifiable supplemental content 132, modifiable descriptive metadata 134, and lifecycle metadata 136, in FIG. 1. It is noted that although in the present embodiment, data structure 220 is shown to hold a single integrated unit of digital media content, i.e., digital media content 230, in other embodiments, data structure 220 may hold one or more additional versions of digital media content 230. It is further noted that although data structure 220 includes lifecycle metadata 236, in other embodiments of the present invention, updating of modifiable elements associated with digital media content 230, such as modifiable supplemental content 232 and/or modifiable descriptive metadata 234, may occur in the absence of lifecycle metadata 236.

Digital media content 230, which may itself comprise a media container file structure, can include audio and video elements, as shown in FIG. 2A. In one embodiment, for example, digital media content 230 may comprise an audio-visual file containing core digital media content including film content, or television program content. In some embodiments, digital media content 230 may be a streamable media file suitable for playback by a consumer utilizing a remote client system, such as media player 104, in FIG. 1, accessing media server 110 over network 102, for example. Digital media content 230 may comprise a core digital media content in one or more of a variety of different encoding formats. For example, digital media content 230 can comprise digital media content encoded as HD content, or as content encoded for distribution to a mobile communication device, such as a mobile telephone, digital media player, PDA, portable computer, or wireless gaming console, for example.

As shown in FIG. 2A, in addition to digital media content 230, data structure 220 also comprises modifiable supplemental content 232, modifiable descriptive metadata 234, and lifecycle metadata 236. Modifiable supplemental content 232 may comprise interactive content including interactive menuing content, promotional content such as movie or television trailers, interactive games associated with the core digital media content of digital media content 230, and advertising content, for example.

Modifiable descriptive metadata 234 may comprise metadata describing modifiable supplemental content 232 and/or digital media content 230. For example, modifiable descriptive metadata may include the title of music or film content corresponding to the digital media content 230, the artist(s) or actor(s) performing the digital media content 230, and the studio producing the digital media content 230. Modifiable descriptive metadata may also include a description of the digital media content 230, information about the encoding of the digital media content 230, rights/licensing information, usage rules, watermarks or copyright ownership, and the like. In some embodiments, modifiable descriptive metadata 234 may comprise secured metadata, modifiable by an owner of digital media content 230, or a third party authorized by the owner, but closed to modification by others, such as a user of media player 104, in FIG. 1, for example. Although not shown in the present figures, in some embodiments, data structure 220 may include non-modifiable supplemental content and/or non-modifiable descriptive metadata, in addition to the modifiable elements represented by modifiable supplemental content 232 and modifiable descriptive metadata 234.

In embodiments in which data structure 220 includes lifecycle metadata 236, such as the embodiment shown in FIG. 2A, lifecycle metadata 236 may specify a lifespan of digital media content 230, during which period updating of modifiable supplemental content 232 and/or modifiable descriptive metadata 234 is supported. The length of the lifespan specified by lifecycle metadata 236 may vary according to the projected demand for, or relevance of, digital media content 230. Such a lifespan may comprise a span of months or years, for example, during which time periodic updating of modifiable supplemental content 232 and modifiable descriptive metadata 234 may be performed, and after which time such updating may cease. In addition, lifecycle metadata 236 may specify one or more updating intervals specifying the frequency with which updates to modifiable supplemental content 232 and modifiable descriptive metadata 234 are sought and/or performed. Thus, lifecycle metadata 236, when present in data structure 220, may enable intelligent updating of modifiable supplemental content 232 and modifiable descriptive metadata 234, for example, by specifying minimal, maximal, or optimal update retrieval parameters.

Referring now to FIG. 2B, FIG. 2B shows a block diagram of system 200 representing an update of modifiable elements contained by data structure 220, in FIG. 2A, according to one embodiment of the present invention. System 200 includes data structure 220a and all of its contents, which correspond respectively to data structure 220 and its contents, shown in FIG. 2A. System 200 also comprises data structure 220b including modifiable supplemental content 232b and modifiable descriptive metadata 234b, in addition to digital media content 230 and lifecycle metadata 236. The designations "a" and "b" in FIG. 2B correspond to the state of data structure 220, and modifiable elements 236 and 238, respectively prior to and after an update operation. Also shown in FIG. 2B are update manager 216 and network 202.

Network 202 corresponds to network 102, appearing in FIG. 1. According to the example shown in FIG. 2B, updating of modifiable supplemental content 232a and modifiable descriptive metadata 234a is mediated by update manager 216. In one embodiment, update manager 216 may correspond to an authoritative external application provided by the owner of digital media content 230, and resident on media server 110, in FIG. 1, for example. In other embodiments, update manager 216 may reside elsewhere than on media server 110, and may comprise an authoritative third party external application authorized by the owner of digital media content 230 to change one or more modifiable elements associated with the core content of data structure 220, in FIG. 2A, i.e., modifiable supplemental content 232 and/or modifiable descriptive metadata 234.

Although the present discussion has thus far described data structures 120 and 220, in FIGS. 1, 2A, and 2B as residing on media server 110, shown in FIG. 1, more generally, that representative data structure may be stored on any suitable computer-readable medium. For example digital media content 130, modifiable supplemental content 132, and modifiable descriptive metadata 134 may be stored on a computer-readable medium, for use by a processor. In some embodiments, the data structure 120 stored on the computer-readable medium may also include lifecycle metadata 136. The expression "computer-readable medium," as used in the present application, refers to any medium that provides instructions to a processor, such as server processor 112 and/or media player processor 106, in FIG. 1. Thus, a computer-readable medium may correspond to various types of media, such as volatile media, non-volatile media, and transmission media, for example. Volatile media may include dynamic memory, such as dynamic random access memory (dynamic RAM), while non-volatile memory may include optical, magnetic, or electrostatic storage devices. Transmission media may include coaxial cable, copper wire, or fiber optics, for example, or may take the form of acoustic or electromagnetic waves, such as those generated through radio frequency (RF) and infrared (IR) communications. Common forms of computer-readable media include, for example, a compact disc read-only memory (CD-ROM), DVD, or other optical disc; a RAM, programmable read-only memory (PROM), erasable PROM (EPROM), FLASH memory, or a transmission carrier wave.

Figure 3:
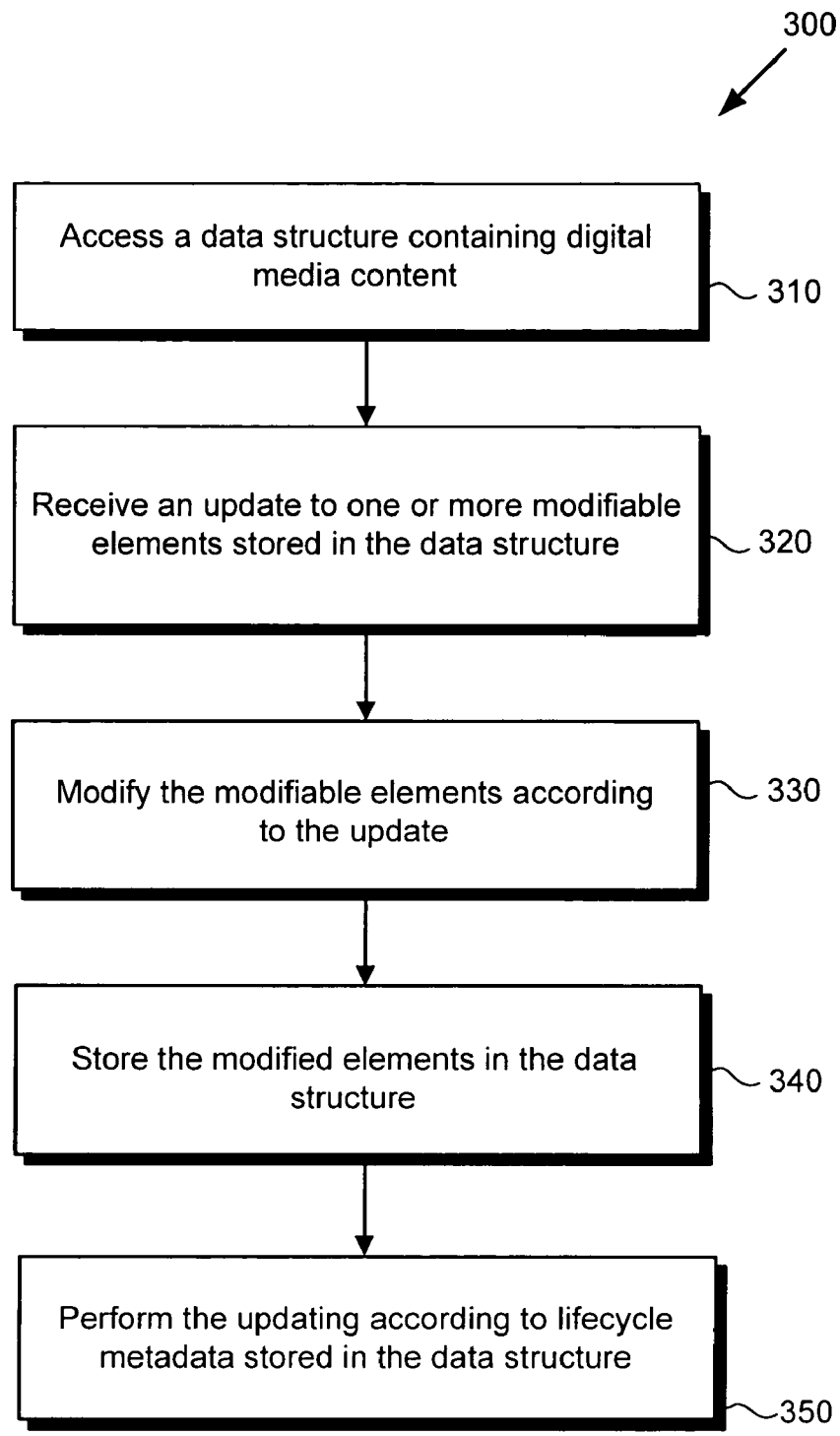
FIG. 3 is a flowchart presenting a method for updating digital media content, according to one embodiment of the present invention.

Turning now to FIG. 3, FIG. 3 shows a flowchart presenting a method for execution by a processor to provide updating of digital media content stored in a data structure, according to one embodiment of the present invention. The steps shown in flowchart 300 are provided merely as examples, however, so that a step may consist of one or more substeps or may involve specialized equipment or materials, as known in the art. While steps 310 through 350 indicated in flowchart 300 are sufficient to describe one embodiment of the present invention, other embodiments may utilize steps different from those shown in flowchart 300, or may include more, or fewer steps.

Starting with step 310 in FIG. 3 and referring to FIG. 1, step 310 of flowchart 300 comprises accessing data structure 120. Step 310 may be performed by server processor 112 and/or media player processor 106. As previously explained, data structure 120 may comprise a container file structure, and may include digital media content 130 in the form of an audio-visual media file and/or a streamable media file. Continuing with step 320 of flowchart 300 and referring again to FIG. 1, step 320 comprises receiving an update to one or more modifiable elements of data structure 120, e.g., one or both of modifiable supplemental content 132 and modifiable descriptive metadata 134, from media server 110. More generally, step 320 corresponds to receiving an update from an authoritative source external with respect to data structure 120, which in the embodiment of FIG. 1 is represented as media server 110, but may otherwise comprise another server accessible over network 102, or a computer readable medium such as an optical disc, or USB dongle, for example. Step 320 may be performed by server processor 112 and/or media player processor 106.

Moving on to step 330 of flowchart 300 and referring to FIGS. 1 and 2B, step 330 comprises modifying one or both of modifiable supplemental content 232a and modifiable descriptive metadata 234a, according to the update retrieved in step 320. As was the case for steps 310 and 320, step 330 can be performed by server processor 112 and/or media player processor 106. Either or both of those processors may be configured to perform the modifications to modifiable elements of data structure 120, such as modifiable supplemental content 232a and modifiable descriptive metadata 234a, according to the update retrieved from media server 110.

Although thus far the modifiable media elements of data structure 220a have been characterized as corresponding to modifiable supplemental content 232a and modifiable descriptive metadata 234a, in some embodiments, other media elements contained by data structure 220a may be modifiable as well. For example, in one embodiment, digital media content 230 may itself be modifiable. In that embodiment, for instance, the development of a new or improved codec providing better video quality and performance may be delivered as a modification upgrade of digital media content 230, without requiring re-acquisition of entire data structure 220a. That approach would further advantageously enable retention of all other modifiable media elements of data structure 220a that may have been updated or modified in the past.

In one embodiment, the updating process may be further mediated by an external application, represented in FIG. 2B by update manager 216. In one such embodiment, update manager 216 may correspond to an external application provided by the owner of digital media content 230, and executed by server processor 112 and/or media player processor 106. In other such embodiments, update manager 216 may comprise a third party external application authorized by the owner of digital media content 230 to change modifiable elements associated with the core content of data structure 220, in FIG. 2A, e.g., modifiable supplemental content 232 and modifiable descriptive metadata 234. Modifiable supplemental content 232 is content associated with digital media content 230, and as previously explained in conjunction with FIG. 2A, may comprise interactive content including interactive menuing content, promotional content such as movie or television trailers, interactive games, and advertising content, for example. As previously described, modifiable descriptive metadata 234 may comprise metadata describing modifiable supplemental content 232 and/or digital media content 230.

Continuing with step 340 of flowchart 300, the modified versions of modifiable supplemental content 232 and modifiable descriptive metadata 234, e.g., modifiable supplemental content 232b and modifiable descriptive metadata 234b, shown in FIG. 2B, are stored in the data structure, e.g. data structure 220b. Once again, step 340 may be performed by server processor 112 and/or media player processor 106, in FIG. 1. In one embodiment, for example, data structure 120 including digital media content 130 may reside locally on media player 104, in which case step 340 may be performed by media player processor 106 alone. Because the present method utilizes data structure 120 as an archive for substantially all of the data elements associated with digital media content 130 in a single integrated data structure, e.g., data structure 120, a subsequent method step of copying data structure 120 (not shown in flowchart 300) transfers the modified elements along with the core digital media content contained in digital media content 130. Thus, the present method provides that updates to modifiable elements such as modifiable supplemental content 132 and modifiable descriptive metadata 134 are persistently stored with, and are transferred with, digital media content 130, through inclusion in data structure 120.

Continuing with step 350 of flowchart 300 and referring again to FIG. 1, step 350 comprises performing the update to the modifiable elements included in data structure 120 according to lifecycle metadata 136. Step 350 may be performed by server processor 112 and/or media player processor 106. As previously discussed, lifecycle metadata may or may not be included in data structure 120. When present, lifecycle metadata 136 defines parameters according to which updating of digital media content 130 may be performed. For example, lifecycle metadata 136 may specify a lifespan of digital media content 130, during which time updating of modifiable supplemental content 132 and/or modifiable descriptive metadata 134 is supported. In addition, lifecycle metadata 136 may specify one or more updating intervals specifying the frequency with which updates to modifiable supplemental content 132 and/or modifiable descriptive metadata 134 are performed. Furthermore, lifecycle metadata 136 may include authentication information enabling identification of authoritative sources for providing updates, such as an application provided by an owner of digital media content 130, or third party applications other than those provided by the owner, that are nevertheless authorized to mediate updating of modifiable supplemental content 132 and/or modifiable descriptive metadata 134.

As a specific example of the foregoing, consider digital media content 130 to comprise a feature film distributed over the Internet, for playback by a media player 104 in possession of a user. According to the present example, data structure 120 is used as a container for the feature film, resides on the media player memory after transfer over network 102, and includes modifiable supplemental content 132 and modifiable descriptive metadata 134 associated with the feature film, as well as lifecycle metadata 136 specifying how long updates to the modifiable data associated with the feature film are to be provided. Let us assume that lifecycle metadata 136 specifies a lifespan for digital media content 130 lasting ten years. Let us further assume that some months after distribution of the media, the feature film wins an Academy Award, and that two years after distribution of the media, a relatively obscure supporting actor in the feature film gains great celebrity.

Clearly, modifiable supplemental content 232a and modifiable descriptive metadata 234a included in the original distribution cannot include information or content about the later honor earned by the film, or the subsequent celebrity enjoyed by one of its actors. However, according to the present inventive concepts, during the ten year lifespan specified by lifecycle metadata 236, modifiable descriptive metadata 234a may be updated to modifiable descriptive metadata 234b, which may include information about the Oscar and may further emphasize the contributions of the newly celebrated actor. In addition, modifiable supplemental content 232a may be updated to modifiable supplemental content 232b, so that original release trailers for the feature film comprised by digital media content 230 can be substituted with trailers for a sequel or related films, or include content promoting more recent work by the formerly obscure actor who is now a major box office draw. Moreover, in embodiments in which modifiable supplemental content 232a comprises advertising content, modifiable supplemental content 232a may include both a particular advertisement and a time code for advertising placement. In those embodiments, updating of modifiable supplemental content 232a may include updating of the advertisement and/or the time code for the advertisement, for example, by an authoritative source.

As previously discussed, in some embodiments, updating of modifiable elements such as modifiable supplemental content 232a and/or modifiable descriptive metadata 234a may be performed during playback of digital media content 230 by media player 104. In other embodiments, however, updating of modifiable supplemental content 232a and/or modifiable descriptive metadata 234a is performed as a background operation when digital media content 230 is not being played back, for example, in conjunction with network-attached storage of data structure 220.

Thus, a system and method for updating digital media content has been described. From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A system for updating digital media content, the system comprising:
   a data structure residing on a media storage, wherein the data structure is a single integrated data structure transferable to a media player device configured to play back the digital media content, and the digital media content including a lifecycle metadata is stored in the data structure, wherein the lifecycle metadata defines lifecycle management parameters of the digital media content;
   a processor coupled to the media storage and configured to:
      access the data structure;
      receive an update from a source determined by the lifecycle metadata to at least one modifiable element of the data structure;
      modify the at least one modifiable element according to the update; and
      store the modified at least one modifiable element in the data structure;
   the updating of the digital media content by the processor resulting in the modified at least one modifiable element being persistently stored in the data structure.

2. The system of claim 1, wherein the source determined by the lifecycle metadata is an authoritative source external with respect to the data structure, the authoritative source comprising a media server accessible over a communication network.

3. The system of claim 1, wherein the source determined by the lifecycle metadata is an authoritative source external with respect to the data structure, and wherein the authoritative source is one of an owner of the digital media content and a third party authorized by the owner of the digital media content.

4. The system of claim 1, wherein the data structure comprises a container file structure.

5. The system of claim 1, wherein the digital media content included in the data structure comprises streamable media.

6. The system of claim 1, wherein the at least one modifiable element of the data structure comprises the digital media content.

7. The system of claim 1, wherein the at least one modifiable element of the data structure comprises modifiable supplemental content.

8. The system of claim 7, wherein the modifiable supplemental content comprises interactive content.

9. The system of claim 7, wherein the modifiable supplemental content comprises one of interactive menuing content, advertising content, and promotional content.

10. The system of claim 1, wherein the at least one modifiable element of the data structure comprises modifiable descriptive metadata.

11. The system of claim 10, wherein the modifiable descriptive metadata comprises one of a description of the digital media content, a title of the digital media content, the name of an artist performing the digital media content, and a studio producing the digital media content.

12. The system of claim 1, wherein the processor is further configured to perform the updating as a background operation occurring when the digital media content is not being played back.

13. The system of claim 1, wherein the processor is a component of a network-attached storage system.

14. The system of claim 1, wherein the processor is included in the media player device configured to play back the digital media content.

15. The system of claim 1, wherein the lifecycle metadata specifies a lifespan of the digital media content during which updating of the at least one modifiable element of the data structure is supported.

16. The system of claim 1, wherein the lifecycle metadata specifies at least one updating interval specifying the frequency with which an update to the at least one modifiable element of the data structure is performed.

17. The system of claim 1, wherein the lifecycle management parameters defined by the lifecycle metadata comprises authentication information enabling identification of authoritative sources for providing the update.

18. The system of claim 1, wherein the data structure is a container file.

19. A system for updating digital media content, the system comprising:
a data structure residing on a media storage, wherein the data structure is a single integrated data structure transferable to a media player device configured to play back the digital media content, and the digital media content is stored in the data structure, the data structure including a lifecycle metadata defining lifecycle management parameters of the digital media content;
a processor coupled to the media storage and configured to:
access the data structure;
receive an update from a source determined by the lifecycle metadata to at least one modifiable element of the data structure;
modify the at least one modifiable element according to the update; and
store the modified at least one modifiable element in the data structure;
the updating of the digital media content by the processor resulting in the modified at least one modifiable element being persistently stored in the data structure.

20. The system of claim 19, wherein the processor is further configured to perform the updating according to the lifecycle management parameters of the digital media content defined by the lifecycle metadata.

21. The system of claim 19, wherein the lifecycle metadata specifies a lifespan of the digital media content during which updating of the at least one modifiable element of the data structure is supported.

22. The system of claim 19, wherein the lifecycle metadata specifies at least one updating interval specifying the frequency with which an update to the at least one modifiable element of the data structure is performed.

23. The system of claim 19, wherein the at least one modifiable element of the data structure comprises modifiable supplemental content.

24. The system of claim 19, wherein the at least one modifiable element of the data structure comprises modifiable descriptive metadata.

25. A method for execution by a processor to update digital media content stored in a data structure, the method comprising:
accessing the data structure;
receiving an update from a source determined by a lifecycle metadata to at least one modifiable element of the data structure, wherein the lifecycle metadata defines lifecycle management parameters of the digital media content;
modifying the at least one modifiable element according to the update; and
storing the modified at least one modifiable element in the data structure;
the updating of the digital media content resulting in the modified at least one modifiable element being persistently stored in the data structure, wherein the data structure is a single integrated data structure transferable to a media player device configured to play back the digital media content.

26. The method of claim 25, wherein the source determined by the lifecycle metadata is an authoritative source external with respect to the data structure, the authoritative source comprising a media server accessible over a communication network.

27. The method of claim 25, wherein the is source determined by the lifecycle metadata is an authoritative source external with respect to the data structure, and wherein the authoritative source is one of an owner of the digital media content and a third party authorized by the owner of the digital media content.

28. The method of claim 25, wherein the data structure comprises a container file structure.

29. The method of claim 25, wherein the digital media content included in the data structure comprises streamable media.

30. The method of claim 25, wherein the at least one modifiable element of the data structure comprises the digital media content.

31. The method of claim 25, wherein the at least one modifiable element of the data structure comprises modifiable supplemental content.

32. The method of claim 31, wherein the modifiable supplemental content comprises interactive content.

33. The method of claim 31, wherein the modifiable supplemental content comprises one of interactive menuing content, advertising content, and promotional content.

34. The method of claim 25, wherein the at least one modifiable element of the data structure comprises modifiable descriptive metadata.

35. The method of claim 34, wherein the modifiable descriptive metadata comprises one of a description of the digital media content, a title of the digital media content, the name of an artist performing the digital media content, and a studio producing the digital media content.

36. The method of claim 25, wherein the updating is performed as a background operation when the digital media content is not being played back.

37. The method of claim 25, wherein the updating is performed by one of a network-attached storage system and the media player device configured to play back the digital media content.

38. The method of claim 25, further comprising copying the data structure, the copying of the data structure resulting in copying of the modified at least one modifiable element, in addition to copying of the digital media content.

39. The method of claim 25, wherein the updating comprises modifying one of an advertisement or a time code for the advertisement.

40. The method of claim 25, wherein the lifecycle metadata specifics a lifespan of the digital media content during which updating of the at least one modifiable element of the data structure is supported.

41. The method of claim 25, wherein the lifecycle metadata specifies at least one updating interval specifying the frequency with which an update to the at least one modifiable element of the data structure is performed.

42. A computer-readable medium having stored thereon a data structure for modification by a processor in updating a digital media content, the data structure comprising:
the digital media content including a lifecycle metadata; and
at least one modifiable element associated with the digital media content;
the updating of the digital media content by the processor from a source determined by the lifecycle metadata resulting in a modification to the at least one modifiable element being persistently stored in the data structure, wherein the data structure is a single integrated data structure transferable to a media player device configured to play back the digital media content,
wherein the lifecycle metadata defines lifecycle management parameters of the digital media content.

43. The computer-readable medium of claim 42, wherein the data structure comprises a container file structure.

44. The computer-readable medium of claim 42, wherein the digital media content included in the data structure comprises streamable media.

45. The computer-readable medium of claim 42, wherein the at least one modifiable element of the data structure comprises modifiable supplemental content.

46. The computer-readable medium of claim 45, wherein the modifiable supplemental content comprises one of interactive menuing content, advertising content, and promotional content.

47. The computer-readable medium of claim 42, wherein the at least one modifiable element of the data structure comprises modifiable descriptive metadata.

48. The computer-readable medium of claim 47, wherein the modifiable descriptive metadata comprises one of a description of the digital media content, a title of the digital media content, the name of an artist performing the digital media content, and a studio producing the digital media content.

49. The computer-readable medium of claim 42, wherein the source determined by the lifecycle metadata is an authoritative source external with respect to the data structure, wherein the authoritative source is one of an owner of the digital media content and a third party authorized by the owner of the digital media content.

50. The computer-readable medium of claim 42, wherein the lifecycle metadata specifies instructions for updating the at least one modifiable element associated with the media content.

51. The computer-readable medium of claim 50, wherein the lifecycle metadata specifies one of a lifespan of the digital media content during which updating of the at least one modifiable element of the data structure is supported, and an updating interval specifying the frequency with which an update to the at least one modifiable element of the data structure is performed.

* * * * *